United States Patent [19]
Moffet, Jr.

[11] Patent Number: 4,803,803
[45] Date of Patent: Feb. 14, 1989

[54] GROWING MEDIUM FOR PLANTS

[76] Inventor: Frank W. Moffet, Jr., 944 Allens Creek Rd., Rochester, N.Y. 14618

[21] Appl. No.: 855,757

[22] Filed: Apr. 24, 1986

[51] Int. Cl.$^4$ ............................................. A01G 31/00
[52] U.S. Cl. .................................... 47/59; 47/DIG. 3
[58] Field of Search ................. 71/27, 52, 62, 18, 903, 71/64.04, 64.03, 64.13; 47/DIG. 10, 59, 74, 62, 63, 61, DIG. 4, DIG. 7, 56, 58

[56] References Cited

U.S. PATENT DOCUMENTS

| | | |
|---|---|---|
| 2,051,279 | 8/1936 | Thorndyke . |
| 2,155,107 | 8/1939 | Tyler . |
| 2,192,939 | 3/1940 | Slayter ............................ 47/56 X |
| 2,193,982 | 3/1940 | Ramseyer . |
| 2,728,741 | 12/1955 | Simon . |
| 2,753,277 | 7/1956 | Smithers . |
| 2,791,496 | 5/1957 | Rice . |
| 2,891,355 | 6/1959 | Nelson . |
| 2,945,820 | 7/1960 | Ziegler . |
| 3,003,911 | 10/1961 | Lindstrom . |
| 3,062,753 | 11/1962 | Hayes . |
| 3,441,400 | 4/1969 | Otrhalek . |
| 3,459,531 | 8/1969 | Chapin . |
| 3,524,279 | 8/1970 | Adams . |
| 3,831,317 | 8/1974 | Porte . |
| 4,166,162 | 8/1979 | Weissenfels . |
| 4,168,962 | 9/1979 | Lambeth . |
| 4,174,957 | 11/1979 | Webb . |
| 4,196,543 | 4/1980 | Dedolph . |
| 4,241,537 | 12/1980 | Wood . |
| 4,579,578 | 4/1986 | Cooke ............................ 47/DIG. 10 |

FOREIGN PATENT DOCUMENTS

| | | |
|---|---|---|
| 1227724 | 10/1966 | Fed. Rep. of Germany . |
| 1960937 | 6/1971 | Fed. Rep. of Germany .... 47/DIG. 10 |
| 2827524 | 6/1978 | Fed. Rep. of Germany . |
| 2915370 | 10/1980 | Fed. Rep. of Germany .......... 47/59 |
| 3121277 | 12/1982 | Fed. Rep. of Germany . |
| 152416 | 9/1983 | Japan .................................... 47/59 |
| 1161021 | 6/1985 | U.S.S.R. ................................ 47/59 |
| 2163336 | 2/1986 | United Kingdom . |

OTHER PUBLICATIONS

American Nurseryman "Rock Wool-Growing Medium of the Future?", pp. 12, 13, 85, Aug. 1, 1979.

Primary Examiner—Robert A. Hafer
Assistant Examiner—Danton D. DeMille
Attorney, Agent, or Firm—Bacon & Thomas

[57] ABSTRACT

The present invention provides a plant growth media which comprises small tufts of mineral wool having dispersed therein, particles of acidic phenolic resin for pH control and particles of vermiculite. The ingredients and structure of the product results in a lightweight growth media having a suitable pH for growing certain plants while also providing for flowability, enhanced water adsorption and cohesiveness which prevents the composition from spilling out of certain types of plant containers. The composition also provides enhanced root anchorage without sacrificing the properties of flowability and water adsorption. The composition also optimizes other features which makes the composition and ideal plant growth media.

2 Claims, No Drawings

GROWING MEDIUM FOR PLANTS

BACKGROUND OF INVENTION

The present invention pertains to the art of growing plants and artifical media useful for growing the plants.

BACKGROUND INFORMATION

Various types of compositions have been developed for germinating seeds and growing plants. Generally, these compositions provide an environment for plant growth which simulates, to varying degrees, the conditions found in the natural or native soil. Compositions of this type were developed because it is not always desirable to use native soil for germinating seeds or growing plants. Native soil often contains many ingredients, some of which may actually hinder the growth of the plants. Disease organisms may also be present in native soil and these organisms are difficult to eliminate. Also, the soils from one location to another may vary considerably, thus making a uniform product difficult to formulate from native soil sources. Additionally, the structure of the native soil does not always provide the optimum environment for plant growth. Often times the native soil is too compact for many types of plants. For these reasons, different types of synthetic growing media have been developed for the purpose of providing uniform, predictable growth conditions which can be modified in accordance with the particular growth requirements of any plant being cultivated.

Ideally, a synthetic plant growth medium should provide proper soil structure for plant growth. This structure should be sufficiently porous for moisture retention and it should have the ability to contain sufficient air therein to satisfy the plant root requirements for oxygen. It should also be able to provide for proper chemical environment, such as pH, for optimum growth. It should be flowable for easy packaging, handling and use in different types of containers while, at the same time, it should be lightweight and capable of providing adequate anchorage for the roots so that the plants are not easily knocked over.

The materials used in the composition should be sufficiently cohesive so that they do not easily spill out of their container. However, this quality of cohesiveness should not be optimized at the expense of the property of flowability.

The ingredients should be free of disease or toxic materials. They should be compatible with each other and be capable of releasing the necessary plant nutrients for optimum growth. It should be easily manufactured and the ingredients should be inexpensive. Finally, it should be durable and retain its structure and properties for a long time.

It has generally not been possible to combine all the ideal features spoken of above, in a single composition. Usually, one or a few qualities are stressed at the sacrifice of others. For example, water adsorption has been optimized in some compositions by the use of certain porous ingredients while the ability to provide root anchorage has been sacrificed.

For example, one type of plant growth medium comprises shredded styrofoam. U.S. Pat. No. 2,891,355 typifies compositions of this type. The shredded Styrofoam requires the addition of a detergent to provide the necessary water adsorbency so that the medium is able to contain sufficient moisture to sustain plant gowth. composition of this type generally do not provide a complete medium for optimum plant growth conditions. The shredded Styrofoam lacks the type of soil structure required for proper anchoring of the plants and, thus, the plants tend to be weak and can easily fall over due to insufficient anchorage. Also, any plant nutrients incorporated into the Styrofoam are easily leached out of the zone of growth when the plant is watered.

U.S. Pat. No. 4,174,957 provides a synthetic growing mixture which comprises a mixture of urea-formaldehyde foam ganules, powdered peat or humus and a wetting agent to help promote water adsorption. The composition of this patent lacks sufficient structure to provide for effective root anchorage. Also, the composition of this patent requires peat or humus which is a naturally occuring organic soil additive which will eventually break down. Thus, after a period of time, only the urea-formaldehyde will remain in the composition since the other components will either break down or be leached away. Furthermore, the peat or humus, being a naturally occuring soil component, could easily introduce disease organisms into the growing medium.

Other plant growth mediums have concentrated on select features without providing a truely balanced medium which approaches the idea as discussed above. U.S. Pat. No. 3,441,400 uses an angular porous mineral carrier in a plant growth media. This material serves as a soil adjuvant and as a nitrogen containing ingredient which resists leaching. U.S. Pat. No. 3,831,317 uses a polymeric pulp material as a plant growth medium. This material is said to have enhanced capillary action which aids in the plants water and fertilizer requirements. U.S. Pat. No. 4,241,537 uses an aqueous polyurethane gel as a plant growth medium. This material is described as useful for supplying water to the plants. None of the compositions described in the above cited patents address all the factors which make a soil composition ideal.

Other examples include U.S. Pat. Nos. 3,524,279; 4,168,962 and 4,196,543. All of these provide growing mediums which are rigid or shaped self-supporting structures. As such, all of these lack some of the features found in the ideal multipurpose media.

Accordingly, there remains a need in the art for a plant growth media which provides a low cost composition which optimizes the features of the ideal plant growth media.

SUMMARY OF THE INVENTION

The present invention relates to a platn growth media suitable for germinating seeds, growing plants and other related uses that plant growth media are typically used in the field of horticulture.

The invention comprises a blend of ingredients whichprovides a combination of properties for an ideal plant growing environment. The growth media comprises a blend of mineral wood, a cationic exchange material such as vermiculite and perlite, and an acidic phenolic resin.

The product is conveniently formulated by combining the vermiculite and/or perlite, mineral wood and powdered phenolic foam resin, subjecting the combination to a mixing step to mix the ingredients and partially break up the mineral wood into limps of about 1" in diameter; and then placing the mixture into a hammer mill to produce a blend. The final blend appears to the naked eye as tufts of cotton (actually mineral wood) about ⅛" to ½" in diameter with phenolic resin powder and specs of vermiculite dispersed throughout the mixture. The tufts of mineral wool take on a grey-green color due to the fine particles of phenolic resins dispersed in and on the network of mineral wool fibers.

Each of these ingredients plays an important role in providing a plant growth medium having a broad spectrum of ideal features. Furthermore, the combination of ingredients provides additional water adsorbency not found in any of the individual ingredients. Additionally, the form and structure of the final product, being composed of tufts of broken mineral wool fibers with phenolic foam powder and vermiculite dispersed therein, makes the mixture flowable, lightweight, highly adsorbent without sacrificing the qualities of cohesiveness and the ability to anchor the roots. The composition also has an enhanced ability to hold and release nutrients to the growing plant. furthermore, the composition is sufficiently cohesive in the wet state so that it can be periodically washed or leached with water to remove unwanted accumulation of contaminants such as salts, without the media itself being washed away.

The phenolic resin is particularly useful because it provides for a particular pH level over a long period of time without the necessity of adding conventional pH adjuvants such as lime or sulfur. The powdered phenolic resin provides a stable pH level while also providing enhanced adsorbency of the water when combined with the other ingredients. The phenolic resin is used in the form of particulates, preferably in the form of a powder. Most preferably the powder is made by pulverizing a mass of phenol-formaldehyde foamed resin.

The fine particles of phenolic resin have adsorption qualities without the addition of detergent or surfactant compositions. In addition, the powdered phenolic foam resin adheres to the tufts of mineral wool and vermiculite. Thus, the powdered foam resin provides for certain advantages such as longer pH regulation than that obtainable by simply adding conventional pH adjuvants such as lime or sulfur to the composition.

The mineral wool in the form of tufts of broken fibers allows the material to be flowable while providing for sufficient cohesiveness which prevents the composition from being easily spilled from its container. This property is particularly important when the product is used in certain types of planters which have vertical walls containing a plurality of openigns for plants, such as strawberry pots. The tufts of mineral wool also provide the uniform dispersal of the fine phenolic foam powder particles. The dispersal property is augmented by the surface adhesion which causes the powder to adhere to the multitude of fibers in each tuft. This adhesion prevents the segregation and loss of the fine powder. Also, the expanded vermiculite particles tend to cling to the-mineral wood tufts so that the tendency of segregation for different types and density of particles is minimized. This particular structure results in the ability to adsorb greater quantities of water without sacrificing the optimization of other factors. Additionally, the mineral wool, being essentially inert in the mixture, is not subject to decay and thus it will provide uniform results over an extended period of time.

The expanded vermiculite is useful because of its water adsorption qualities, cationic exchange capacities and ability to hold nutrients.

The materials used to make the composition of this invention are free of contamination of toxic agents and are substantially sterile with respect to germs such as plant pathogens. The composition also contains a sufficient amount of air to supply the oxygen requirements for roots growing in the media. Furthermore, this air is retained even after overwatering so long as means is provided for excess water to drainfrom the composition. Also, the materials used in this composition are non-reactive with fertilizer materials. For example, nitrogens will not be used up as it might be in a composition which contains various types of decomposable organic mateials such as sawdust and peat.

All of the above ingredients are low in cost and readily available and lightweight for easy shipping, thus making them particularly suitably for formulation into this new composition.

It is an object of this invention to provide a composition useful in processes of growing plants.

It is also an object of this invention to provide a low cost pH adjusted plant growth media which optimizes the ideal features of a platn growth media without compromising or sacrificing any of the ideal features.

It is also an object of this invenion to provide a low cost, lightweight, pH adjusted plant growth media which is highly adsorbent while retaining the ability to anchor the plant roots; and is flowable for easy handling yet is sufficiently cohesive to prevent unwanted spilling from plant containers.

It is also an object to provide a plant growth media having the above mentioned properties and which is also non-toxic and free of disease causing agents.

It is also an object to provide a method of making a plant growth media having the above mentioned properties.

It is also an object to provide a method of growing plants in the above described plant growth media.

These objects and other objects will become apparent to those skilled in the art.

DESCRIPTION OF THE PREFERRED EMBODIMENTS

The composition contains vermiculite, powdered phenolic foam resin and mineral wool. The ingredients and their form and structure contribute to the unique properties of this invention.

In the preferred embodiment, the composition contains ninety parts of mineral wool; thirty-eight parts of foamed phenolic resin and twenty-two parts of vermiculite. All parts given in this specification are parts by weight unless indicated otherwise. The amounts of each ingredient can vary to suit particular plants, especially the needs of particular plants being used with the composition. In general, the major ingredient is the mineral wool which provides the built of the final product. Lesser quantities, each of the resin and vermiculite, can be blended with the mineral wool. For most plant growing needs, the formulation will vary from the above mentioned preferred embodiment by plus or minus twenty percent (20%) for each ingredient.

the structure of the ingredients in the final product of the preferred embodiment is also important. The mineral wood is in the form of tufts. The tufts are formed by taking conventional mineral wool and subjecting it to forces which pull apart and break the mineral fibers into short length fibers and mixing the broken fibers to form tufts. The fibers are pulled apart and broken up into lengths which are long enough so that they are capable of forming the tufts.

In a preferred embodiment, the fibers are subjected to breaking and mixing forces to break and mix the fibers to such an extent that tufts are formed which are about ⅛" to ½" in diameter. Larger or smaller tufts can be used but this size range is found to be particularly convenient for most planting purposes.

The breaking and mixing action canb e carried out in any conventional device known to those skilled in the art for this purpose. It is also possible to pull apart and break the fibers by hand to form the tufts. In a preferred embodiment, the mineral wool is first placed in a mixing apparatus for mixing and breaking the fibers. The mineral wool is mixed until tufts of about 1" in diameter are formed. Thereafter, the 1" tufts are placed in a hammer mill for further processing until tufts of about ⅛" to ½" in diameter are formed.

Conventional mineral wool or rock wool is used in the invention. Mineral wool, sometimes referred to as rock wool, is a common ingredient used in many fields of technology such as the field of insulation. It is a fine fibrous "wool like" material made by forming fine filaments of mineral fiber from a molten rock. Many processes are known for making the mineral wool. Examples of this type of product are disclosed in U.S. Pat. Nos. 2,193,982; 2,051,279 and 2,155,107, the specifications of which are incorporated herein by reference.

Preferably the mineral wool for the present invention is made from a silica containing mineral such as basalt. Other types of mineral are permissible so long as they do not contain harmful ingredients. Even fiberglass of the type used in typical home insulation is acceptable but is not preferred because it is less adsorbent and is somewhat irritable to personnel who handle it. For the purposes of this invention, the term "mineral wool" includes glass wool and the like.

The vermiculite is conventional vermiculite as is currently used in soil conditioners and other types of plant growth formulation. Preferably, expanded or exfoliated vermiculite is used. Vermiculite is a micaceous mineral, chemically identified as a hydrated magnesium-aluminum-iron silicate, with a platelet-like structure which exfoliates or expands when heated or subjected to certain chemical processes. The mineral occurs naturally in an unexpanded state and is mined in conventional manners. The mined ore is milled to controlled sizes and then exfoliated. The exfoliation is generally accomplished by dropping the milled ore in a continuous stream through a furnace, the chamber temperature of which has variously been reported in ranges of from about 1400° to 2200° F., depending upon the design of the furnace and the burners, and on the location and type of temperature measuring means. During exfoliation, each granule or particle of vermiculite expands to several times its original size and traps within itself thousands of air cells.

Any suitable method may be used to expand or exfoliate the vermiculite. Many methods are known for producing suitable expanded vermiculite. Exemplitive methods and products are disclosed in U.S. Pat. Nos. 2,791,496; 3,062,753; 2,945,820 and 3,459,531, the specifications of which are incorporated herein by reference.

The expanded vermiculite is broken up into small size pieces. In the preferred embodiment, the largest particles of vermiculite are about the size of the smaller tufts, or about ⅛" diameter although most of them are considerably smaller so that they give the appearance of specks of vermiculite in and on the tufts. A conventional hammer mill may be used to break up the vermiculite.

The phenolic resin is a phenol-formaldehyde resin. Preferably it is a foamed resin in the form of a block or mass which is then pulverized into a powder. The resin may be foamed by any conventional method. The powder is made sufficiently fine so that it adheres to the mineral wool tufts within the interstices thereof and does not become segregated from the tufts during ordinary handling.

Phenol-formaldehyde foam resins are welll known to those skilled in the art. Typical examples are described in U.S. Pat. Nos. 2,278,741 and 4,166,162, the specifications of which are incorporated herein by reference. In the preferred embodiment, the phenol-formaldehyde resin is formulated so that it has an acidic pH. A particularly useful resinfor this embodiment is the phenol-formaldehyde describe in U.S. Pat. No. 2,753,277, the specification of which is incorporated herein by reference.

In a preferred embodiment of this invention, the foamed phenol-formaldehyde resin described in U.S. Pat. No. 2,753,277, is pulverized into a powder and mixed in with the vermiculite and mineral wool as defined above. It is not necessary, however, for the incorporation ofany wetting aent or surfactant into the phenol-formaldehyde because the structure of the final compositiondoes not require a wetting agent to achieve its unusually high water adsorption.

In a preferred embodiment, the final product is obtained by mixing the mineral wool with #3 size expanded vermiculite and acidic phenol-formaldehyde foam which has been previously pulverized to a powder. The ingredients are mixed until the mineral wool breaks up and forms tufts of about 1" in diameter. At that point, the entiremixture is subjected to the action of a hammer mill unitl tufts are generally reduced in size to about ⅛" to about ½" in diameter, it being realized tha the hammer mill process will result in a distribution of sizes withsome tufts being smaller than ⅛" in diameter and some which may be slightly larger.

The mixing and milling also reduces the diameter of the vermiculite to a size which ranges generally from powder size particles to pieces which are about the size of the ⅛" tufts. The size range of the vermiculite in the final product gives the appearance of "specks" of vermiculite in and one the tufts of mineral wool.

The material of the above described preferred embodiment is flowable and is capable of adsorbing large quantities of water. It is also capable of providing superior anchorage for the plant roots due to the nature of the tufts. The property of root anchorage is provided without sacrificing the properties of flowability of water adsorption. The presence of the powdered acidic phenolic resin in the interstices of the tufts provides a long lasting means of assuring properpH for acid loving plants such as strawberries. Furthermore, since the resin adhers to the mineral fiber, it does not become segregated therefrom nor is it easily washed from the composition.

Although the composition is flowable, it is sufficiently cohesive so that it is not easily lost through the holes in the planters. Also, it holds fertilizer due to the ionic effects oif the vermiculite, yet it can be leached from time to time to wash away accumulated contaminants without fear of losing the particulate materials which make up the composition.

The composition is suitable for a wide variety of horticultural uses. As such, any of the usual adjuvants may be added to the comosition to accomplish their intended purposes. For eample, fertilizer, both liquid and solid, are desirably used with the composition. Biocidal compositions for efficient disease or insect control may also be added.

The composition of this invention is particularly suitable for acid loving plants such as strawberries. Strawberries are often grown in special receptacles such as pots which have a plurality of side holes. Typically, a strawberry plant grows out of each of these holes. However, due to the positions of the holes, it is very easy for the soil or other growing medium to spill out of the holes, especially immediately after planting since the roots have not fully developed to a point where they can hold in the soil. The unique cohesiveness of the growing medium of this invention prevents the soil from spilling out of the holes yet it is sufficiently flowable so that no difficulty is encountered when filling the pot with the medium.

The composition is also useful for germinating seeds. Seeds can be planted in this material and treated with any suitable adjuvant which aids in seed germination. Thereafter, the developing plant can be grown in accordance with accepted methods of horticulture.

Although it is preferable to formulate the mixture containing mineral wool, acidic phenolic resin and a cation exchange material such as vermiculite and perlite, suitable compositions may be made evenif the resin or cation exchange material were omitted. Thus, a composition containing tufts of mineral wool in combination with the vermiculite or perlite may be made. Such a compositionwould be preferred if an acid artifical soil were not desired,f or example, as when one wishes to grow plants which require a neutral or somewhat alkaline soil. Also, the vermiculite or perlite could be omitted from the composition to result in an artifical soil composed of tufts of mineral wool with particles of phenol-formaldehyde dispersed throughout the interstices thereof.

The following example is given as a preferred embodiment of the inention.

Thirty-eight (38) pounds of acidic phenol-formaldehyde foam resin was pulverized to a powder. The foam is identified as "Oasis" which is a acidic phenol-formaldehyde foam resin sold by Smithers Company of Kent, Ohio. The powdered phenolic resin was mixed with inety (90) pounds of mineral wool and twenty-two (22) pounds of #3 expanded vermiculite. The vermiculite was obtained from W. R. Grace and Company and the mineral wool was purchased from U.S. Mineral Wool Company in New Jersey. The compositionwas mixed until the mineral wool was broken up sufficiently to form tufts of about 1" in diameter. At that point, the material was transferred to a hammer mill for further processing until tufts of about $\frac{1}{8}$" to $\frac{1}{2}$" diameter were formed. The final product was gray-green in color and had the appearance of tufts of cotton with specks of vermiculite dispersed therein.

While the present invention has been described in terms of certain preferred embodiments and exemplified with respect thereto, one skilled in the art will readily appreciate that various modification, changes, omissions and substitutions may be made without departing from the spirit thereof. It is intended, therefore, that the present invention be limited solely by the scope of the following claims.

I claim:

1. The method of making a plant growth media which comprises mixing mineral wool fiber with expanded vermiculite particles and powdered phenol-formaldehyde resin having an acid pH, said mixing being continued until the mineral wool forms tufts of about 1" in diameter and thereafter subjecting the mixture to a hammer mill until the tufts are reduced in size to about $\frac{1}{8}$"-$\frac{1}{2}$" in diameter.

2. The method of claim 12 wherein the mineral wool is present in an amount of 72–108 parts by weight; the phenol-formaldehyde is present in an amount of 30–47 parts by weight and the vermiculite is present in an amount of 18–26 parts by weight.

* * * * *

UNITED STATES PATENT AND TRADEMARK OFFICE
CERTIFICATE OF CORRECTION

PATENT NO. : 4,803,803

DATED : February 14, 1989

INVENTOR(S) : Frank W. Moffett, Jr.

It is certified that error appears in the above-identified patent and that said Letters Patent is hereby corrected as shown below:

Title page:

Line [19], change "Moffet, Jr." to --Moffett, Jr.--; and

Line [76], change "Moffet, Jr.," to --Moffett, Jr.,--.

Signed and Sealed this

Third Day of April, 1990

Attest:

HARRY F. MANBECK, JR.

*Attesting Officer*     *Commissioner of Patents and Trademarks*